US011662581B2

(12) United States Patent
Cakmakci et al.

(10) Patent No.: US 11,662,581 B2
(45) Date of Patent: May 30, 2023

(54) HEAD MOUNTED DISPLAY WITH LIGHTGUIDE AND HOLOGRAPHIC ELEMENT

(71) Applicant: GOOGLE LLC, Mountain View, CA (US)

(72) Inventors: Ozan Cakmakci, Sunnyvale, CA (US); Yi Qin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 16 days.

(21) Appl. No.: 16/682,446

(22) Filed: Nov. 13, 2019

(65) Prior Publication Data

US 2021/0141226 A1 May 13, 2021

(51) Int. Cl.
*G02B 27/01* (2006.01)
*G02B 5/30* (2006.01)

(52) U.S. Cl.
CPC ....... *G02B 27/0172* (2013.01); *G02B 5/3025* (2013.01); *G02B 2027/0174* (2013.01); *G02B 2027/0178* (2013.01)

(58) Field of Classification Search
CPC .............. G02B 27/0172; G02B 5/3025; G02B 2027/0178; G02B 2027/0174; G02B 27/0103; G02B 2027/0181; G02B 2027/0183
USPC .......................................................... 359/13
See application file for complete search history.

(56) References Cited

U.S. PATENT DOCUMENTS

| 4,859,031 | A | 8/1989 | Berman et al. |
| 8,976,449 | B2 | 3/2015 | Ida |
| 10,345,589 | B1* | 7/2019 | Son .......................... G02B 5/30 |
| 2006/0039046 | A1 | 2/2006 | Ouchi et al. |
| 2007/0291339 | A1 | 12/2007 | Kumasawa |
| 2009/0040294 | A1 | 2/2009 | Smalley et al. |
| 2015/0277116 | A1 | 10/2015 | Richards et al. |
| 2016/0379606 | A1* | 12/2016 | Kollin .................. G03H 1/0005 345/428 |

(Continued)

FOREIGN PATENT DOCUMENTS

| CN | 105487170 A | 4/2016 |
| CN | 109891332 A | 6/2019 |

(Continued)

OTHER PUBLICATIONS

Magarinos, J. et al., "Holographic Mirrors," Proceedings of SPIE 0523, Applications of Holography, Jun. 12, 1985; doi: 10.1117/12. 946285; 17 pages.

(Continued)

*Primary Examiner* — Thomas K Pham
*Assistant Examiner* — Henry Duong

(57) ABSTRACT

A head mounted display (HMD) system employs a holographic element in the optical path of the HMD to direct light to a user's eye. The HMD includes a micro-display, a lightguide, and a holographic element coupled to the lightguide. The holographic element is coupled to a polarization film, and together the element and film reflect and transmit light of different polarities in a specified pattern to assist the lightguide in directing light to the user's eye. For example, the hologram and polarization film can be configured to pass R-polarized light and reflect L-polarized light, thereby directing light from the waveguide along a specified path.

17 Claims, 3 Drawing Sheets

(56) References Cited

U.S. PATENT DOCUMENTS

| | | | |
|---|---|---|---|
| 2018/0120563 A1 | 5/2018 | Kollin et al. | |
| 2018/0259826 A1 | 9/2018 | Xiao et al. | |
| 2019/0086674 A1* | 3/2019 | Sinay | G02B 27/0172 |
| 2019/0285939 A1 | 9/2019 | Lee et al. | |
| 2019/0331922 A1 | 10/2019 | Kim et al. | |
| 2021/0096453 A1* | 4/2021 | Wheelwright | G02B 27/017 |

FOREIGN PATENT DOCUMENTS

| | | |
|---|---|---|
| FR | 2693004 A1 | 12/1993 |
| GB | 2296808 A | 7/1996 |
| JP | 06273691 A | 9/1994 |
| JP | H09197554 A | 7/1997 |
| JP | 2004205973 A | 7/2004 |
| JP | 2005148655 A | 6/2005 |

OTHER PUBLICATIONS

Extended European Search Report dated Mar. 15, 2021 for European Application No. 20207421.7, 8 pages.
Chinese Office Action dated Jan. 13, 2022 for CN Application No. 202011271171.X, 19 pages.
Office Action dated Jun. 14, 2022 for Chinese Patent Application No. 202011271171.X, 24 pages.
Third Chinese Office Action dated Aug. 22, 2022 for CN Application 202011271171.X, 16 pages. Includes English translation.

* cited by examiner

HEAD MOUNTED DISPLAY WITH LIGHTGUIDE AND HOLOGRAPHIC ELEMENT

BACKGROUND

Head mounted display (HMD) systems provide a way to visually immerse a user in a virtual reality (VR) or augmented reality (AR) environment, or to display other content to a user in a convenient way. Some HMD systems include a micro-display that emits an image via a set of light rays. The light rays are coupled to an optical path of the HMD and that directs the light rays to the eye of the user. However, conventional HMD systems have limitations that can negatively impact the viewer experience. For example, the optical path of a conventional HMD includes components having a relatively large or bulky form factor, thereby limiting the design of the overall form factor for the HMD.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate systems and techniques for employing a holographic element in the optical path of an HMD to direct light to a user's eye. The HMD includes a micro-display, a lightguide, and a holographic element coupled to the lightguide. The holographic element is coupled to a polarization film, and together the element and film reflect and transmit light of different polarities in a specified pattern to assist the lightguide in directing light to the user's eye. For example, the hologram and polarization film can be configured to pass R-polarized light and reflect L-polarized light, thereby directing light from the waveguide along a specified path. The holographic element has a relatively small form factor, thereby supporting more flexible and comfortable HMD designs.

To illustrate, conventional HMD designs typically employ multiple optical elements, such as mirrors and lenses, to direct light from a lightguide to a user's eye. These optical elements are relatively bulky, thereby requiring the HMD to employ a large form factor and limiting the placement of the optical elements to a few locations of the HMD form, such that the overall form factor of the HMD is uncomfortable for the user. For example, the optical elements may be placed near a user's eye, or in a user's peripheral vision, thereby distracting the user. The optical elements may also be relatively heavy, so that wearing the HMD induces fatigue in the user. In contrast, a holographic element is relatively small and light as compared to conventional optical elements, and thus allows for more flexible and comfortable HMD designs.

Figure 1:
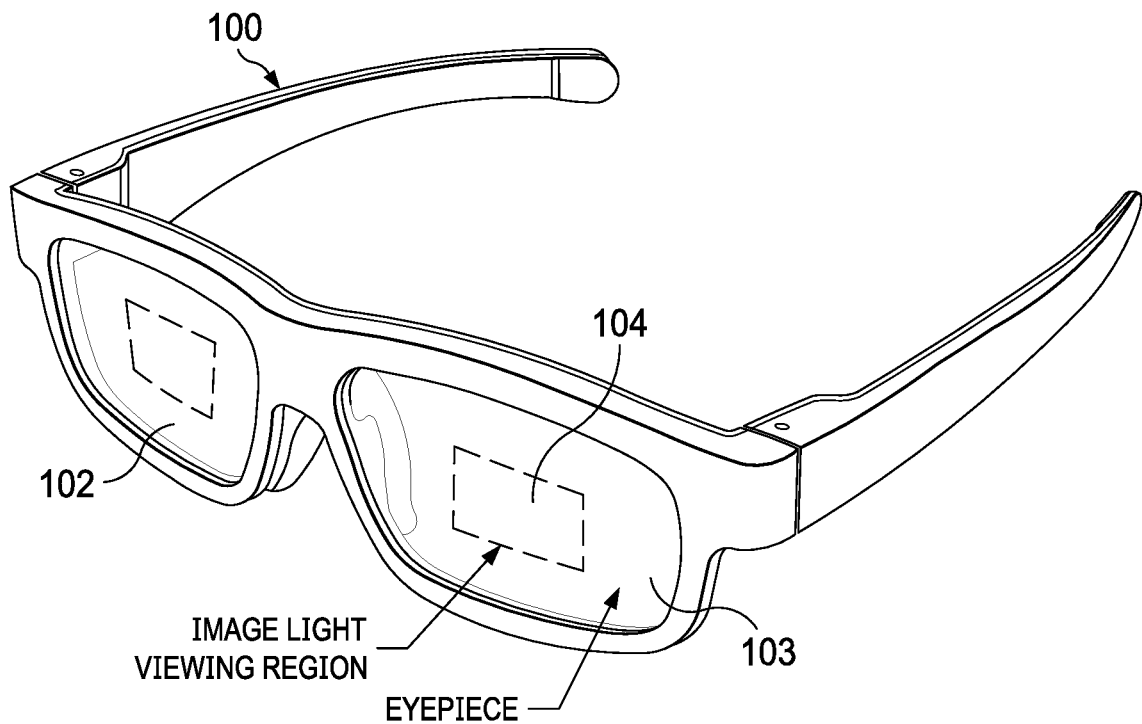
FIG. 1 is a diagram of an HMD system including a lightguide and a holographic element to control provision of light to a user's eye in accordance with some embodiments.

FIG. 1 illustrates an HMD 100 in accordance with some embodiments. In the depicted example the HMD 100 has an eyeglass form factor and includes two see-through eyepieces 102 and 103 that each provide image light to a user in a viewing region (e.g. viewing region 104) along with a view of the surrounding environment. The image light may be augmented reality data that provides information of one or more objects in the surrounding environment. Additionally, the image light provides other information to the user such as text messages, email messages, phone call information, etc.

The HMD 100 includes electronics and a micro-display (not shown at FIG. 1) to project the image light to the user. The electronics are either coupled to a secondary electronics device, such as a computer or cell phone, that provides the data for generating the image light, or the electronics include wireless communication technology that allows for the receipt of the information via a wireless network, such as Bluetooth, Wi-Fi or cellular.

As described further below, each eyepiece includes a lightguide that provides an optical pathway for the image light to propagate from the micro-display to the image light viewing region 104, which is arranged to be aligned with the user's eye. The lightguide relies on total internal reflection (TIR) for propagating the image light from an input coupler to an output coupler, which redirects the light out of the HMD 100 and toward the eye of the user in the image light viewing region. The eyepieces may additionally include vision correction lensing for the user or absorbing sunglass coatings.

In at least one embodiment, the lightguide is coupled to additional components to support directing the image light to the viewing region 104, including a holographic element. The holographic element directs light from the lightguide to the viewing region 104 as described further herein.

Figure 2:
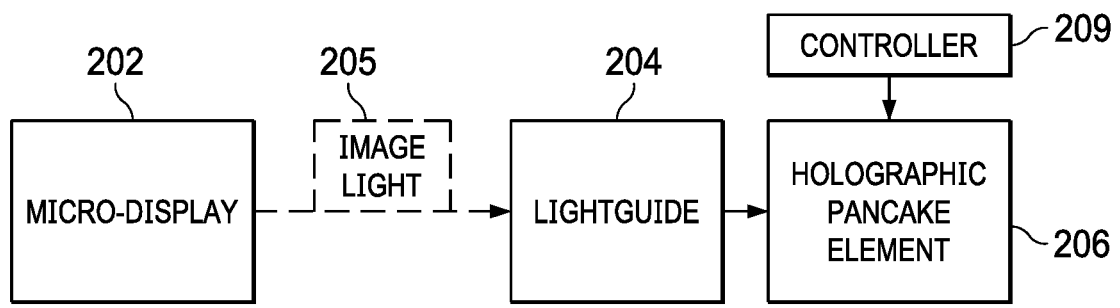
FIG. 2 is a block diagram illustrating a portion of the HMD of FIG. 1 including the multifocal module in accordance with some embodiments.

FIG. 2 illustrates a block diagram of portions of the HMD 100 in accordance with some embodiments. In the depicted example, the HMD 100 includes a micro-display 202, a lightguide 204, a holographic element 206 and a controller 209. The micro-display is generally configured to generate image light 205 based on image frames received from a graphics processing unit (GPU) or other image frame generator (not shown).

The lightguide 204 includes a first surface that passes the image light 205 to an internal region of the lightguide 204. Further, the lightguide 204 is positioned so that the image light is reflected off of second and third surfaces of the lightguide 204 until the image light 205 reaches a specified region of the lightguide 204. The specified region passes the image light to the holographic element 206.

In at least one embodiment, the holographic element 206 is a holographic optical element (HOE) such as a "pancake" element and is generally configured to reflect and diffract light to direct the image light 205 to the viewing region 104. In at least one embodiment, the holographic element 206 employs a volume hologram. In some embodiments, the volume hologram (that is, the holographic element 206) is a diffractive element that implements a mirror function. In doing so, unlike a metallic/dielectric optical mirror, the holographic element 206 only operates on a range of angles and wavelengths defined its diffraction efficiency. In contrast, a metallic/dielectric mirror reduces the efficiency of the system and also transmits light from the system into the worldside. In contrast, the volume hologram of the holographic element 206 is higher efficiency and mitigates the worldside light leakage, reducing visual artifacts and improving the user experience.

The controller 209 is configured to control any active elements of the holographic element 206. For example, in some embodiments the holographic element 206 can include one or more positioning elements, such as servo motors, that can change the position of the holographic element 206. The controller 209 controls the positioning elements based on user input or other input information. A user can thereby tune the positioning of the holographic element 206 to change the position of the viewing region 104 in order to provide a more satisfying user experience.

Figure 3:
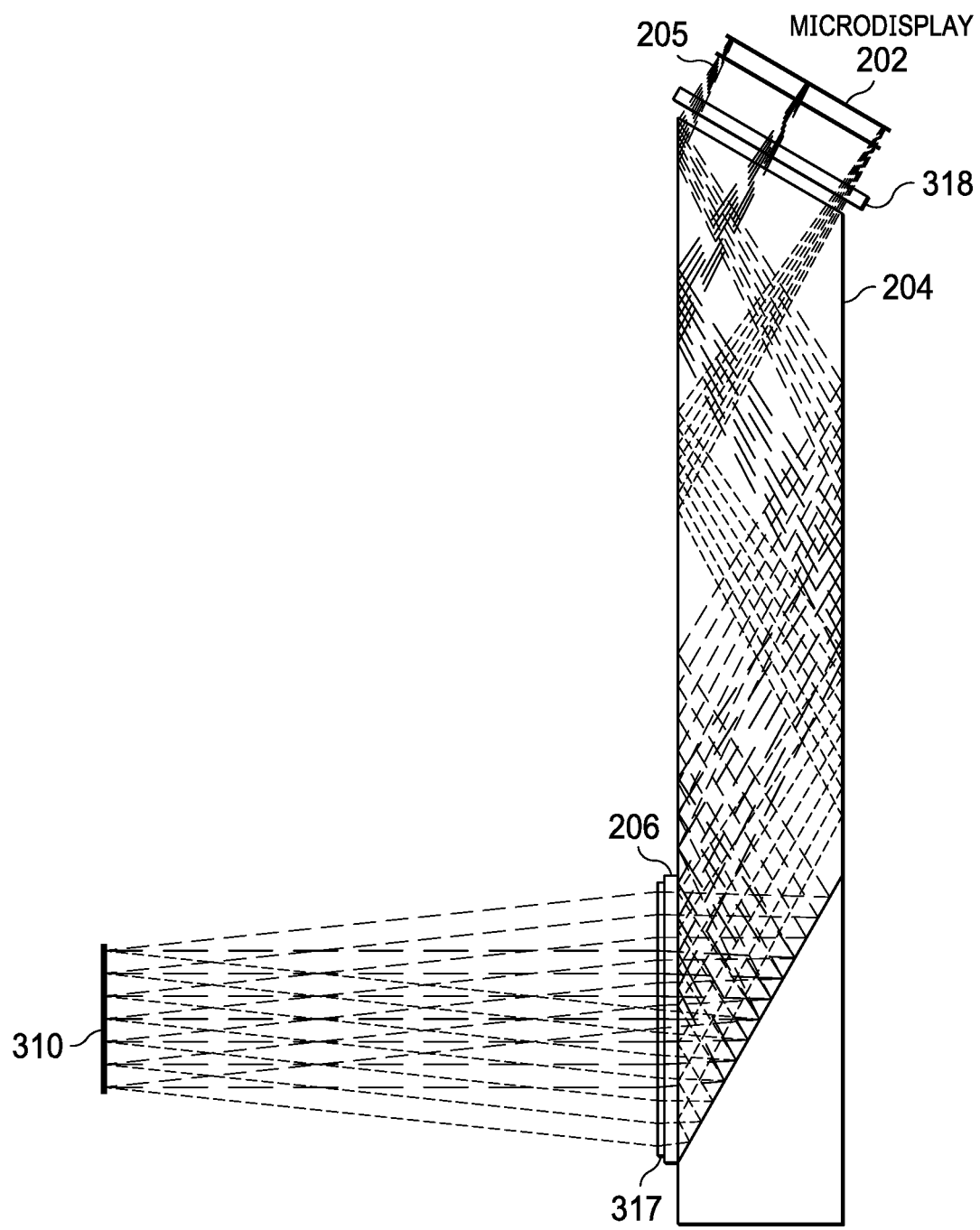
FIG. 3 is a diagram illustrating a portion of the HMD of FIG. 1 including the lightguide and holographic element in accordance with some embodiments.

FIG. 3 illustrates an example portion of the HMD 100 including the lightguide 204 and holographic element 206 in accordance with some embodiments. The lightguide 204 is composed of acrylic, polycarbonate, glass, or other material configured to provide TIR for propagating image light generated by the micro-display 202. In particular, the micro-display 202 generates light based on image frames provided by a graphics processing unit (GPU) or other device (not shown). The HMD 100 includes a polarizer 318 between the micro-display 202 and the lightguide 204 that transforms the display light 205 to linearly polarized light of a specified polarization (e.g. S-polarized light). The HMD 100 further includes a prism positioned to couple the polarized light rays transmitted by the polarizer 318 into the lightguide 204, which propagates the coupled light rays using TIR. The lightguide 211 emits the propagated light so that the rays of the propagated light are provided to a waveplate (not shown) that transforms the linearly polarized light from the lightguide 211 to circularly polarized light, and provides the circularly polarized light to the holographic element 206. The lightguide 211 thus carries the display light from the incoupling surface to the outcoupler formed by the waveplate, the holographic element 206, and the polarization film 317.

In at least one embodiment, the holographic element 206 is coated on one side with a flat polarization film 317 that passes light of a specified polarization and reflects light having a different polarization. In different embodiments, the polarization film 317 is an Advanced Polarizing Film (APF), a wiregrid film, and the like. For purposes of discussion, it is assumed that the polarization film passes L-polarized light and reflects R-polarized light, but in other embodiments different polarizations can be passed and reflected. For example, in some embodiments the polarization film passes R-polarized light and reflects L-polarized light. In addition, the polarization film 317 changes the polarization of the reflected light to the opposite polarization. Further, the hologram of the holographic element 206 is formed so that the hologram passes light having a relatively large angle of incidence with the element, and reflects light having a relatively small angle of incidence. In some embodiments, there can be an air gap between the lightguide 211 and the combination of the holographic element 206 and the polarization film 317. In other embodiments, the combination of the holographic element 206 and the polarization film 317 (and in some embodiments the waveplate described further below) is laminated onto a surface of the lightguide 211.

In operation, the holographic element 206 receives R-polarized light from a waveplate (not shown at FIG. 3) coupled to the lightguide 204 at a relatively high angle of incidence and therefore passes the received light to the polarization film. Because the passed light is R-polarized light, the polarization film reflects the passed light and changes the polarization of the reflected light to L-polarization. The reflected L-polarized light is reflected to the holographic element 206 at a relatively small angle of incidence. Accordingly, the holographic element 206 reflects the L-polarized light. That is, the holographic element 206 acts as a mirror for the L-polarized light reflected from the polarization film. The polarization film 317 transmits the L-polarized light to the viewer at a viewing region 310.

Figure 4:
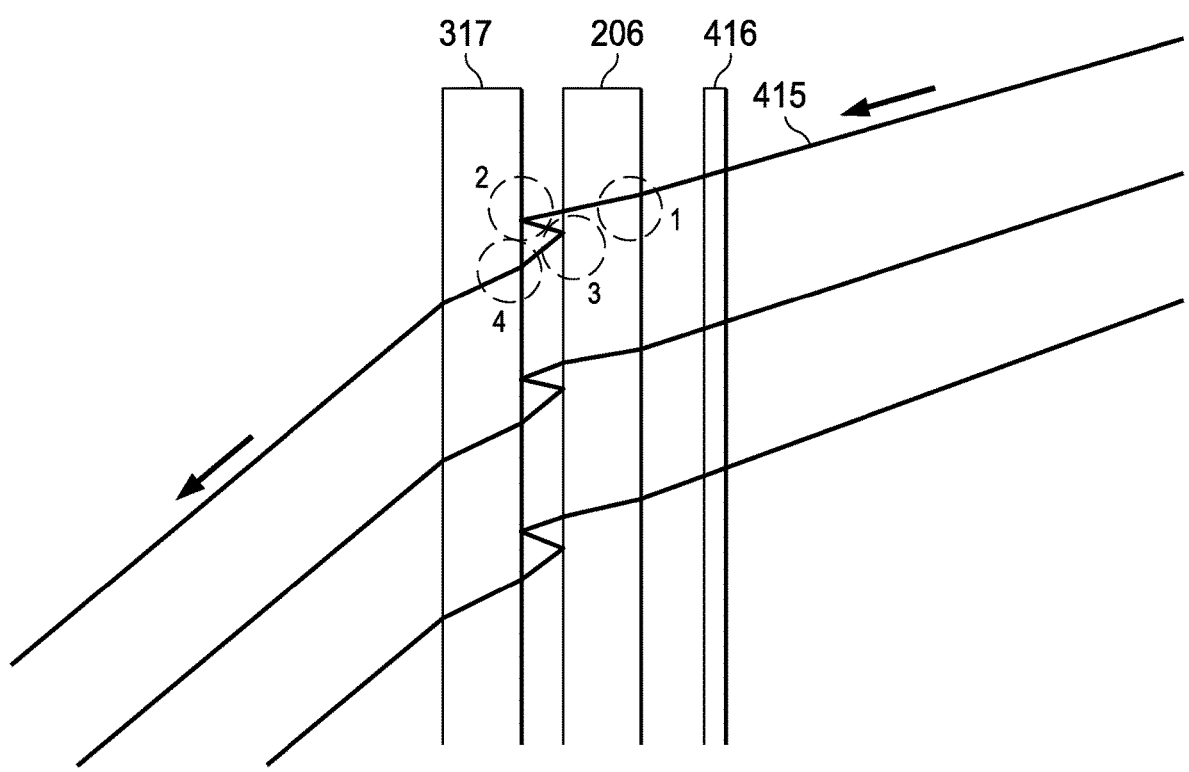
FIG. 4 is a diagram illustrating operation of the holographic element of FIG. 3 in accordance with some embodiments.

The operation of the holographic element 206 can be better understood with reference to FIG. 4. In particular, FIG. 4 illustrates an example of a set of light rays (e.g. light ray 415) propagating through a waveplate 416, the holographic element 206 and the polarization film 317 in accordance with some embodiments. For purposes of the example of FIG. 4, it is assumed that the light rays are generated by the micro-display 202 and are provided to the waveplate 416 by the lightguide 204. In some embodiments, the waveplate 416 is configured to transform linear polarized light provided by the lightguide into circularly polarized light of a given polarization (e.g. right, or R-polarized light).

The depicted example illustrates four interactions of the light ray 415 with the holographic element 206 and the polarization film 317. The interactions are designated with dashed circles and numbered one (1) through four (4). It will be appreciated that the other light rays provided by the lightguide 204 have similar interactions with the waveplate 416, the holographic element 206, and polarization film 317. Prior to interaction 1, the ray 415 is transformed from linear polarized light to R-polarized (right circular polarized) light by the waveplate 416.

Interaction 1 is the light ray 415 being transmitted from the lightguide 204 and interacting with the surface of the holographic element 206. For interaction 1, the light ray 415 has a relatively large angle of incidence (e.g. between about zero degrees and about 40 degrees) with the fringe planes of the holographic element 206. Accordingly, most of the light rays transmitted by the lightguide 204 is transmitted to the polarization film 317 for interaction 2.

It is assumed for purposes of description that the polarization film 317 reflects R-polarized light and passes L-polarized (left circular polarized) light. It is further assumed that the light ray 415 (and the other light rays transmitted by the lightguide 204) are R-polarized light. Accordingly, interaction 2 is the reflection of the R-polarized light transmitted by the holographic element 206 to the polarization film 317. In addition, at interaction 2, the polarization film 317 changes the polarization of the light ray 415 from R-polarized light to L-polarized light. That is, the holographic element 206 transmits the received R-polarized light at interaction 1, and the transmitted light is reflected by the polarization film 317 as L-polarized light.

At interaction 3, the reflected L-polarized light of light ray 415 strikes the holographic element 206 at a relatively small angle of incidence. Accordingly, at interaction 3 the holographic element 206 reflects the light ray 415. At interaction 4, the L-polarized light of light ray 415 is transmitted by the polarization film. 317

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) comprising:
    a micro-display;
    a lightguide having an eye side configured to face an eye of a user and a world side that is substantially opposite the eye side;
    a holographic element, positioned in front of a viewing region and coupled to the eye side of the lightguide, to transmit light provided to the holographic element from the micro-display via the lightguide; and
    a polarization film disposed directly on the holographic element, wherein the polarization film is configured to receive the light from the holographic element, change a polarization of a first portion of the light, and reflect the first portion of the light toward the holographic element.

2. The HMD of claim 1, wherein the holographic element is configured to reflect the first portion of the light reflected by the polarization film based on a first angle of incidence.

3. The HMD of claim 2, wherein the holographic element is configured to transmit the light provided to the holographic element from the micro-display via the lightguide based on a second angle of incidence.

4. The HMD of claim 1, wherein the polarization film is configured to transmit first polarized light having a first polarization.

5. The HMD of claim 4, wherein the polarization film is configured to reflect second polarized light having a second polarization.

6. The HMD of claim 5, wherein the first polarization is a first circular polarization and the second polarization is a second circular polarization.

7. The HMD of claim 1, wherein the holographic element is a volume type holographic element.

8. The HMD of claim 1, wherein an optical configuration of the holographic element is independent of a substrate geometry of the holographic element.

9. A head mounted display (HMD) comprising:
    a micro-display;
    a lightguide to receive light from the micro-display, wherein the lightguide has an eye side configured to face an eye of a user;
    a holographic element, positioned in front of a viewing region and coupled to the eye side of the lightguide, to transmit light from the lightguide based on an angle of incidence of the light; and
    a polarization film disposed directly on the holographic element, wherein the polarization film is configured to receive the light from the holographic element, change a polarization of a first portion of the light, and reflect the first portion of the light toward the holographic element.

10. The HMD of claim 9, wherein the polarization film is configured to transmit first polarized light having a first polarization.

11. The HMD of claim 10, wherein the polarization film is configured to reflect second polarized light having a second polarization.

12. The HMD of claim 11, wherein the first polarization is a first circular polarization and the second polarization is a second circular polarization.

13. The HMD of claim 9, wherein the holographic element is a volume type holographic element.

14. The HMD of claim 9, wherein an optical configuration of the holographic element is independent of a substrate geometry of the holographic element.

15. A method, comprising:
    generating display light at a micro-display;
    transmitting, via a lightguide having an eye side configured to face an eye of a user, light from the micro-display to a holographic element that is positioned in front of a viewing region and coupled to the eye side of the lightguide;

transmitting the light to a polarization film disposed directly on the holographic element;

changing, with a polarization film, a polarization of a first portion of the light;

reflecting, with the polarization film, the first portion of the light to the holographic element; and transmitting the first portion of the light to the viewing region via the holographic element.

16. The method of claim 15, wherein the holographic element is configured to reflect the first portion of the light reflected by the polarization film based on a first angle of incidence.

17. The method of claim 16, wherein the holographic element is configured to transmit the light transmitted by the micro-display via the lightguide based on a second angle of incidence.

\* \* \* \* \*